US012071321B2

(12) United States Patent
Noji et al.

(10) Patent No.: US 12,071,321 B2
(45) Date of Patent: Aug. 27, 2024

(54) SHEET MATERIAL DETECTING DEVICE, SHEET MATERIAL FEEDING DEVICE AND IMAGE FORMING APPARATUS

(71) Applicant: CANON KABUSHIKI KAISHA, Tokyo (JP)

(72) Inventors: Yutaro Noji, Kanagawa (JP); Keisuke Fujita, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 154 days.

(21) Appl. No.: 17/960,869

(22) Filed: Oct. 6, 2022

(65) Prior Publication Data

US 2023/0120649 A1 Apr. 20, 2023

(30) Foreign Application Priority Data

Oct. 14, 2021 (JP) ................................ 2021-168715

(51) Int. Cl.
*B65H 7/14* (2006.01)
*G03G 15/00* (2006.01)

(52) U.S. Cl.
CPC ............... *B65H 7/14* (2013.01); *G03G 15/50* (2013.01); *B65H 2511/12* (2013.01); *B65H 2513/50* (2013.01)

(58) Field of Classification Search
CPC . G03G 15/50; B65H 7/02; B65H 7/14; B65H 7/20; B65H 2511/12; B65H 2513/50; B65H 2513/52; B65H 2701/1311; B65H 2220/02; B65H 2801/12
See application file for complete search history.

(56) References Cited

U.S. PATENT DOCUMENTS 6,741,815 B1 5/2004 Fujita et al.
8,095,062 B2 * 1/2012 Maddux ............ G03G 15/5029 399/376

(Continued)

FOREIGN PATENT DOCUMENTS

JP 2006-240831 A 9/2006
JP 2007145599 A * 6/2007 ........... B41J 11/003

(Continued)

OTHER PUBLICATIONS

Espacenet machine translation of JP2007145599A; https://translationportal.epo.org/emtp/translate/?ACTION=description-retrieval&COUNTRY=JP&ENGINE=google&FORMAT=docdb&KIND=A&LOCALE=en_EP&NUMBER=2007145599&OPS=ops.epo.org/3.2&SRCLANG=ja&TRGLANG=en (Year: 2007).*

*Primary Examiner* — Leslie A Nicholson, III
(74) *Attorney, Agent, or Firm* — Venable LLP

(57) ABSTRACT

A sheet material detecting device includes a leading end flag, a pair of middle size flags, a pair of large size flags which take stand-by positions and operating positions by contacting a sheet, respectively. Each of middle size flags changes from the stand-by position to the operating position linking with changing to the operating position of each of large size flags. A link is moved from a first position to a second position in a case that both of middle size flags take the operating positions and is restricted in movement to the second position in a case that both of middle size fags do not take the operating portions. A controller detects a width of the sheet base on a timing of the operating position of the leading end flag and a timing of movement of the link from the first position to the second position.

15 Claims, 8 Drawing Sheets

(56) References Cited

U.S. PATENT DOCUMENTS

| | | | | |
|---|---|---|---|---|
| 8,285,191 | B2 * | 10/2012 | Kobayashi ......... | G03G 15/6529<br>399/376 |
| 8,849,179 | B2 * | 9/2014 | Sahara ................. | G03G 15/657<br>271/227 |
| 11,286,128 | B2 * | 3/2022 | Matsumoto .............. | B65H 1/04 |
| 11,429,048 | B2 | 8/2022 | Hirajima et al. | |

FOREIGN PATENT DOCUMENTS

| | | | |
|---|---|---|---|
| JP | 2011-116499 | A | 6/2011 |
| JP | 2011-213425 | A | 10/2011 |

* cited by examiner (a)

(b)

SHEET MATERIAL DETECTING DEVICE, SHEET MATERIAL FEEDING DEVICE AND IMAGE FORMING APPARATUS

FIELD OF THE INVENTION AND RELATED ART

The present invention relates to a sheet material detecting device, a sheet material feeding device, and an image forming apparatus, and relates to, for example, a sheet material detecting device which is mounted on an image forming apparatus such as a copier and a printer to detect size of the sheet material.

An image forming apparatus such as a copier and a printer of electrophotographic method separates and feeds the sheet material which is stacked, transfer an image from an image bearing member to the sheet material in an image forming portion, and fix the image to the sheet material by applying heat with a fixing device. Following problems are existed in a case of fixing paper whose sheet width is narrower (hereinafter referred to as "small size paper") than a maximum width of the sheet material (hereinafter referred to as "maximum sheet passage width") among widths of the sheet material (hereinafter referred to as "sheet width") in which the image forming apparatus is possible to feed. That is, since heat is not taken by the sheet material in a portion of the fixing device in which the sheet material does not pass through (hereafter referred to as a "non-sheet passing portion") in the fixing device, the non-sheet passing portion becomes higher temperature than a portion of the fixing device in which the sheet material passes through (hereafter referred to as the "sheet passing portion"). In particular, in a case that the small size paper is continuously fed, the non-sheet passing portion of the fixing device may become excessively high temperature, and the fixing device may have failure.

Further, in a conventional image forming apparatus, the sheet material is fed by defining a standard during feeding in a width direction as a center (hereafter referred to as "center standard feeding"). Therefore, a width restricting member which restricts a movement of the sheet material with respect to the width direction in a stacking portion of the sheet material is provided and the sheet material is stacked while it is arranged in a center. However, a user may accidentally set to arrange the sheet material on one side while fitting the width restricting member to the sheet material of a maximum width. In this case, since a region of the non-sheet passing portion of the fixing device become large, the fixing device tends to become at high temperature. In order to avoid having failure due to excessively high temperature in the fixing device, the image forming apparatus is provided with a width size detecting means which detects a width of the sheet material in a feeding passage. For example, in Japanese Laid-Open Patent Application (JP-A) 2006-240831, in order to detect a small size paper, two types of recording materials of a large size paper and the small size paper are detected by using one photo interrupter and two recording material contact members. Further, for example, in Japanese Laid-Open Patent Application (JP-A) 2011-116499, in order to detect the small size paper, two types of recording materials of the large size paper and the small size paper are detected by using two of the photo interrupters and two of the recording material contact members. The number of sheet materials which are fed per unit of time is called throughput. In a case that the width size detecting means detects that the sheet material in the feeding passage is the small size paper whose paper width is narrow, means, in which the region of the non-sheet passing portion of the fixing device is cooled by increasing an interval between the sheet materials and reducing the throughput compared to a case that a sheet material whose paper width is wider (hereinafter referred to as a large size paper). have been taken.

However, a method which uses one of the photo interrupter and two of the recording material contact members requires a following setup. That is, it is necessary to set the throughput in accordance with the smallest size sheet material which is possible to feed, so that the fixing device does not become excessively high temperature even when a user arranges the sheet material on one side with respect to the image forming apparatus. Therefore, all of a condition of the throughput is for the small size paper except for the sheet material which is detected as the large size paper, and a productivity is reduced. Further, in a method in which two of the photo interrupters and two of the recording material contact member, it is necessary to arrange same detecting mechanisms on both right and left sides, since there is a possibility to detect falsely as the large size paper in a case that a user feeds the sheet material arranging on one side with respect to the image forming apparatus. Thus, a cost becomes higher.

SUMMARY OF THE INVENTION

As described above, it is required to detect a size of the sheet material which is fed at a low cost and accurately.

An object of the present invention is to provide a sheet material detecting device capable of detecting a size of a sheet material which is fed at a low cost and accurately.

In order to solve the problems which are described above, the present invention is provided with following configurations. According to an aspect of the present invention, there is provided a sheet material detecting device comprising, a feeding member configured to feed a sheet material, an inside contact portion provided in a feeding path through which the sheet material passes and configured to be movable by contacting the sheet material, a first contact portion disposed on one side with respect to a center of the feeding path in a widthwise direction perpendicular to a feeding direction of the sheet material and configured to be movable between a first stand-by position and a first operating position, a second contact portion disposed on the other side with respect to the center in the widthwise direction and configured to be movable between a second stand-by position and a second operating position, a third contact portion disposed upstream of the first contact portion and the second contact portion in the feeding direction and outside of the first contact portion with respect to the center in the widthwise direction, and configured to be movable between a third stand-by position and a third operating position, a fourth contact portion disposed upstream of the first contact portion and the second contact portion in the feeding direction and outside of the second contact portion with respect to the center in the widthwise direction, and configured to be movable between a fourth stand-by position and a fourth operating position, a moving member configured to (i) be moved from a first position to a second position different from the first position in a case that the first contact portion is moved to the first operating position and the second contact portion is moved to the second operating position, and (ii) be restricted in movement from the first position to the second position in a case that the first contact portion is positioned in the first stand-by position and/or the second contact portion is positioned in the second stand-by position, and a controller, wherein the inside contact portion is disposed between the first contact portion and the second contact portion in the widthwise direction, wherein the first contact portion is moved from the first stand-by position to the first operating position when the third contact portion is moved from the third stand-by position to the third operating position, and the second contact portion is moved from the second stand-by position to the second operating position when the fourth contact portion is moved from the fourth stand-by position to the fourth operating position, and wherein the controller is configured to detect a width of the sheet material base on a timing of movement of the inside contact member and a timing of movement of the moving member from the first position to the second position.

According to an aspect of the present invention, there is provided an image forming apparatus comprising, an image forming portion configured to form an image on a sheet material, and a sheet detecting device mentioned above, wherein the sheet detecting device is provided upstream of the image forming apparatus in the feeding direction.

Further features of the present invention will become apparent from the following description of exemplary embodiments with reference to the attached drawings.

Figure 3:
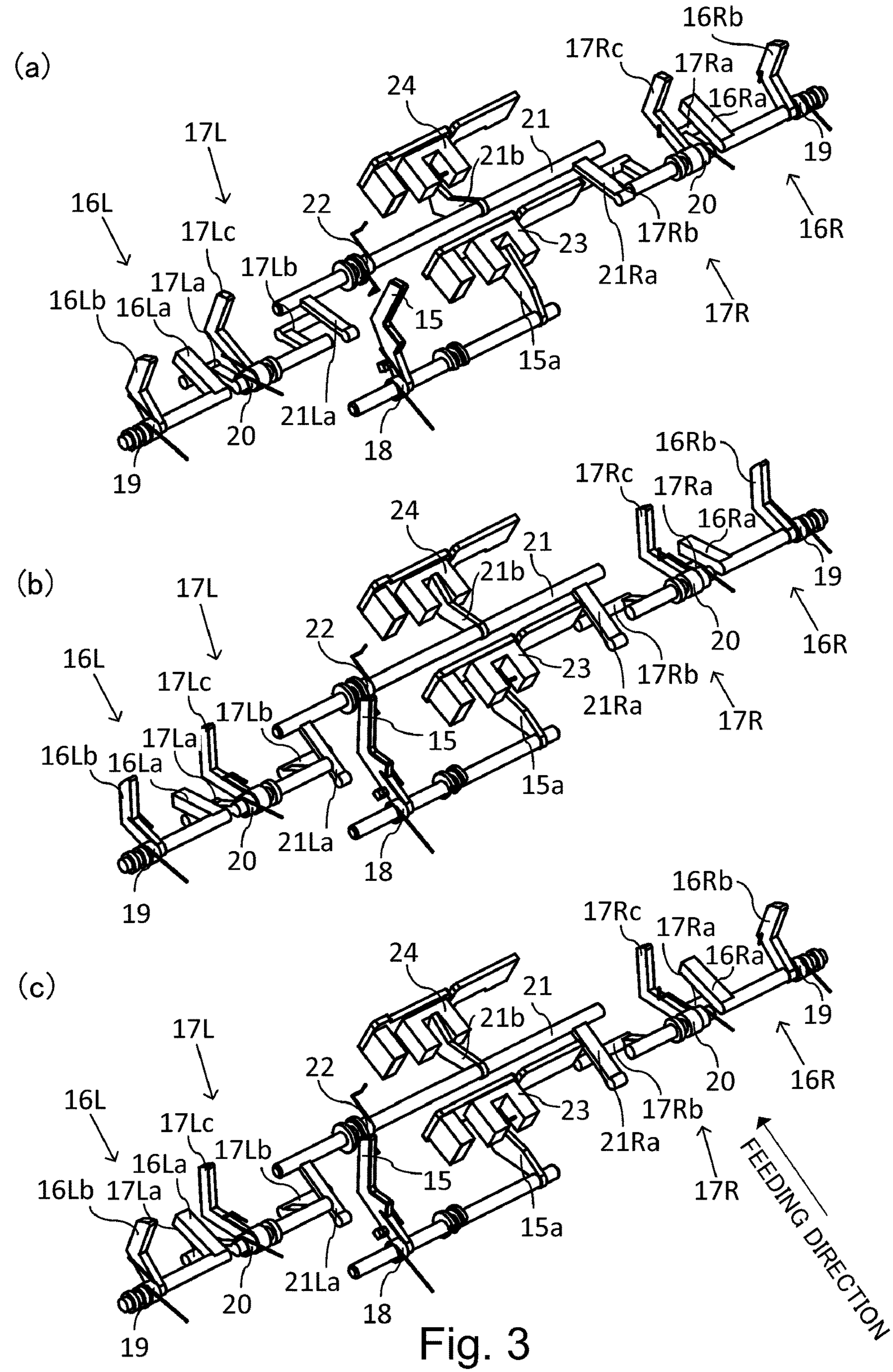

Parts (a) to (c) of FIG. 3 are perspective views of a sheet material detecting mechanism according to the first embodiment.

Figure 4:
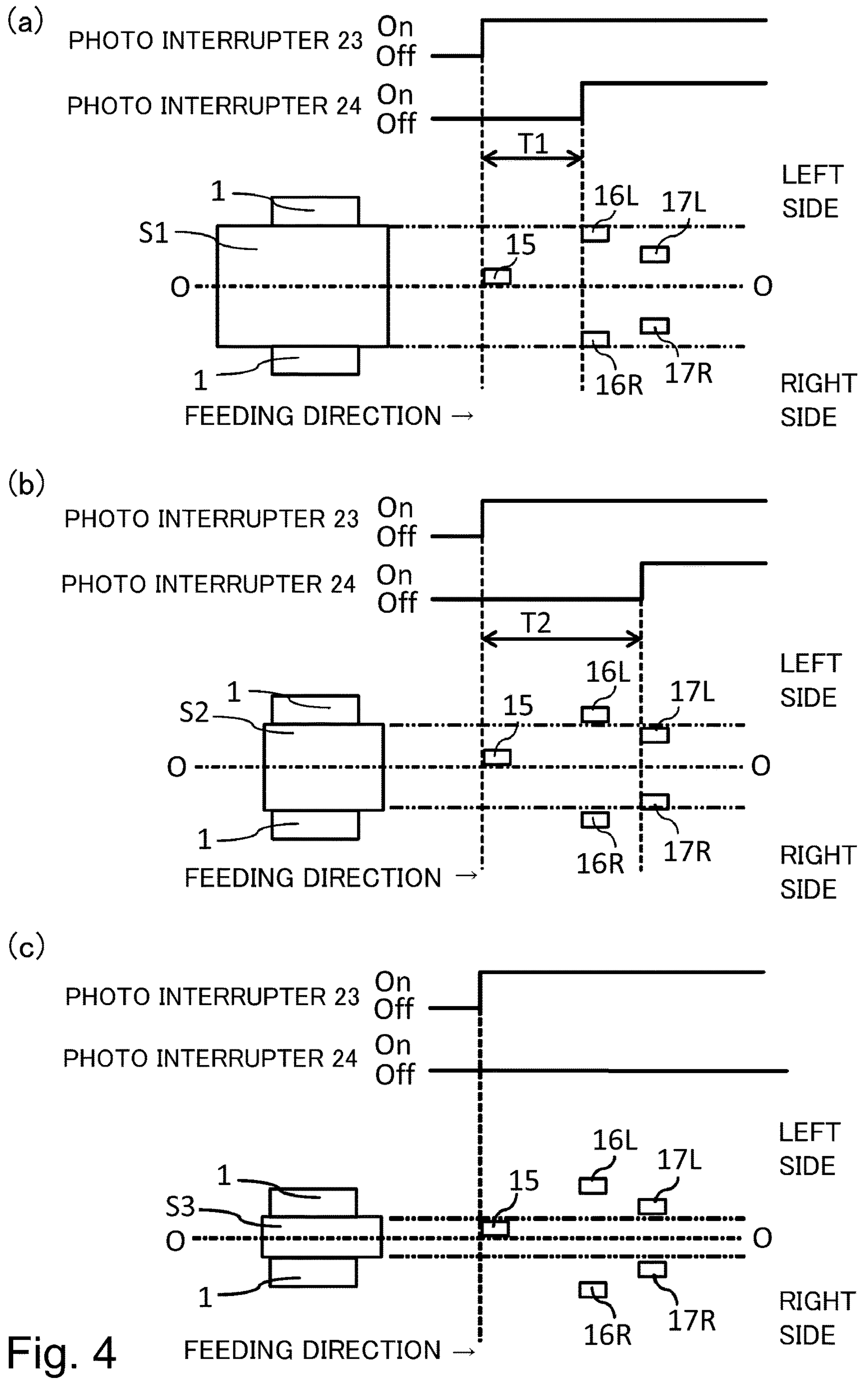

Parts (a) to (c) of FIG. 4 are timing charts of a sheet material size detecting mechanism during center feeding according to the first embodiment.

Figure 5:
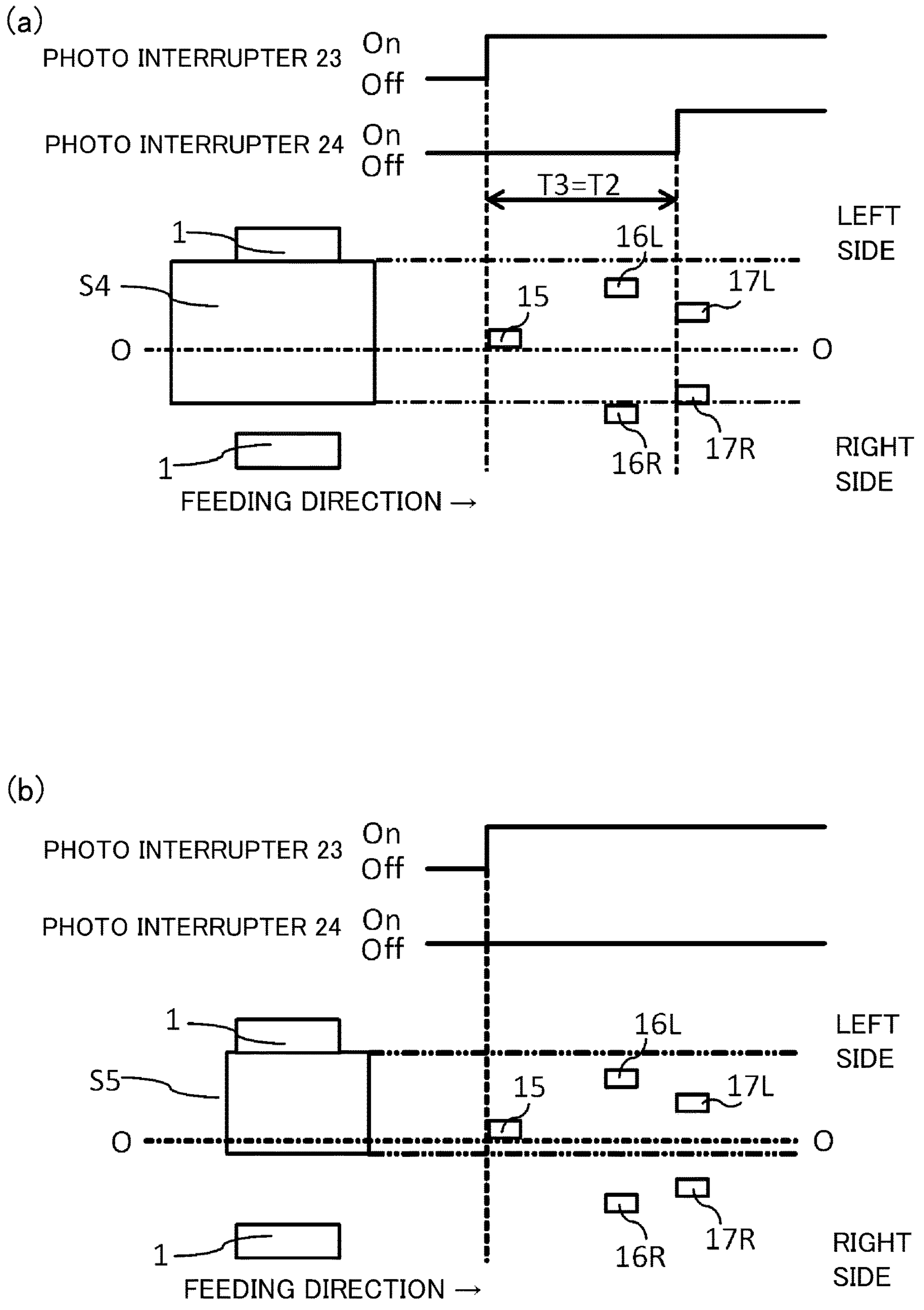

Parts (a) and (b) of FIG. 5 are timing charts of the sheet material size detecting mechanism during one side shifted feeding according to the first embodiment.

Figure 6:
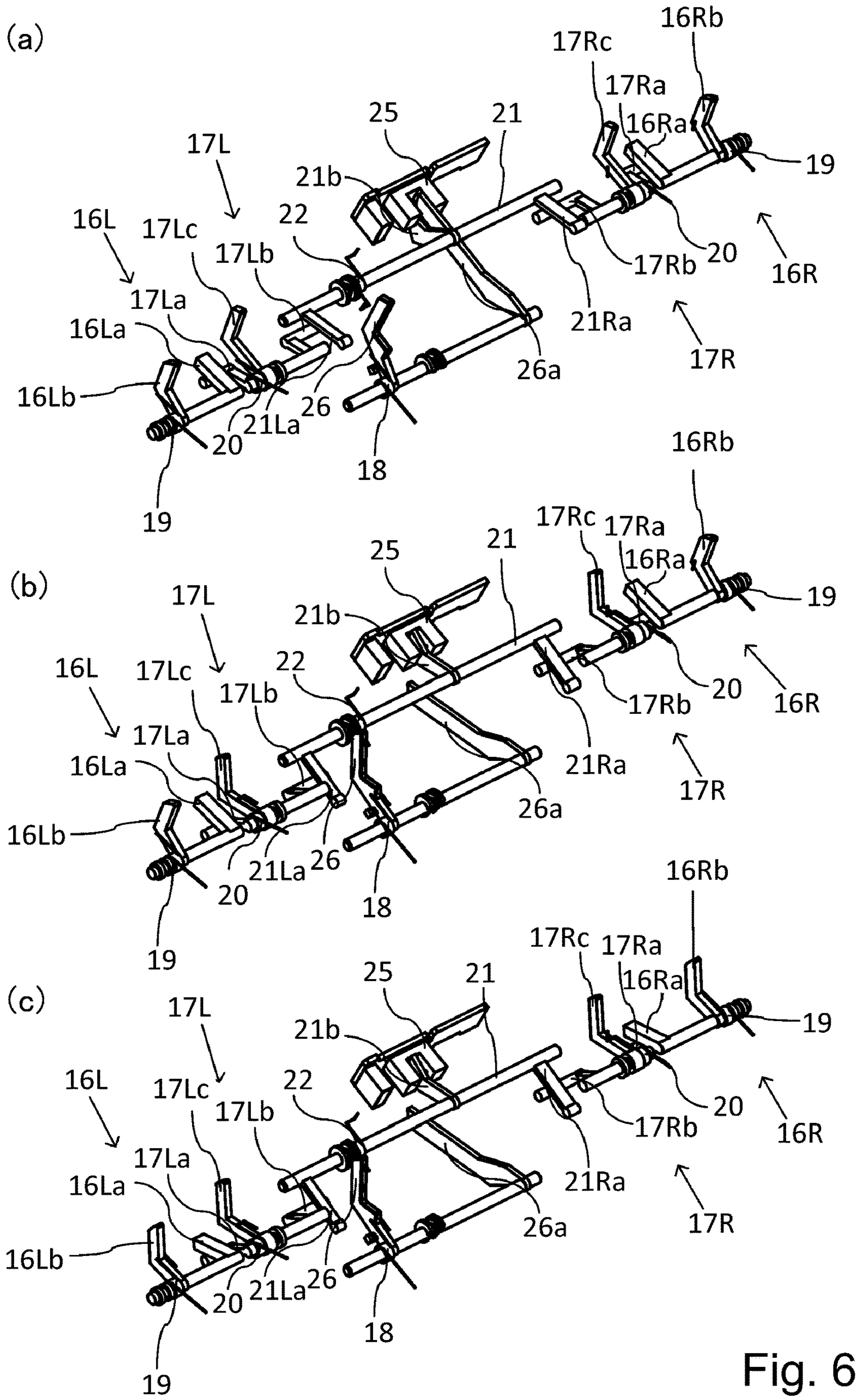

Parts (a) to (c) of FIG. 6 are perspective views of the sheet material detecting mechanism according to the second embodiment.

Figure 7:
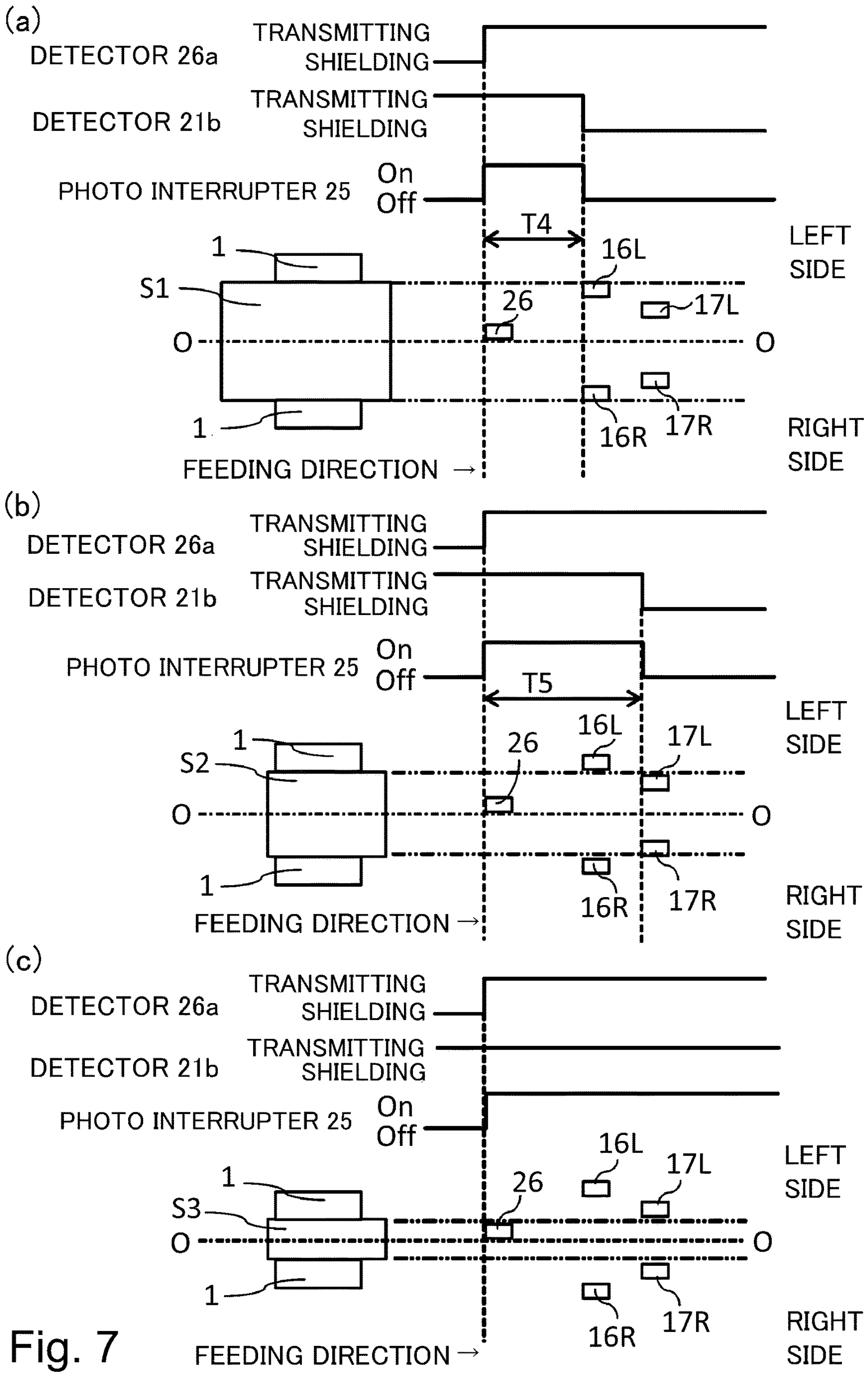

Parts (a) to (c) of FIG. 7 are timing charts of the sheet material size detecting mechanism during center feeding according to the second embodiment.

Figure 8:
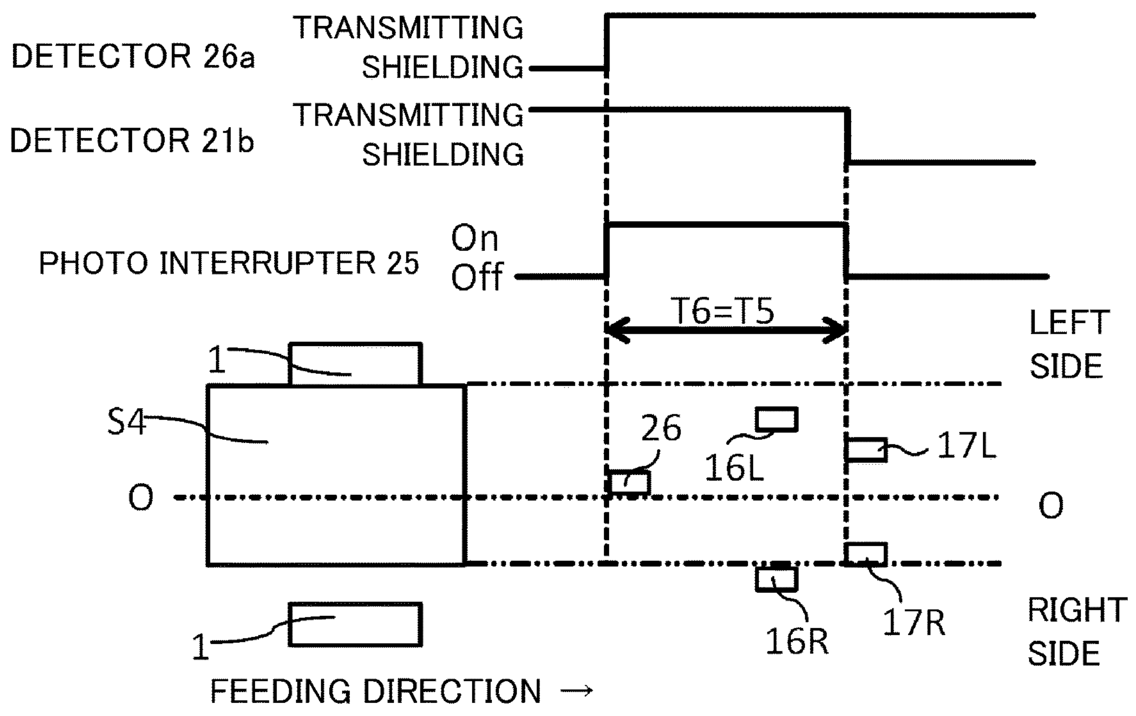
Figure 8:
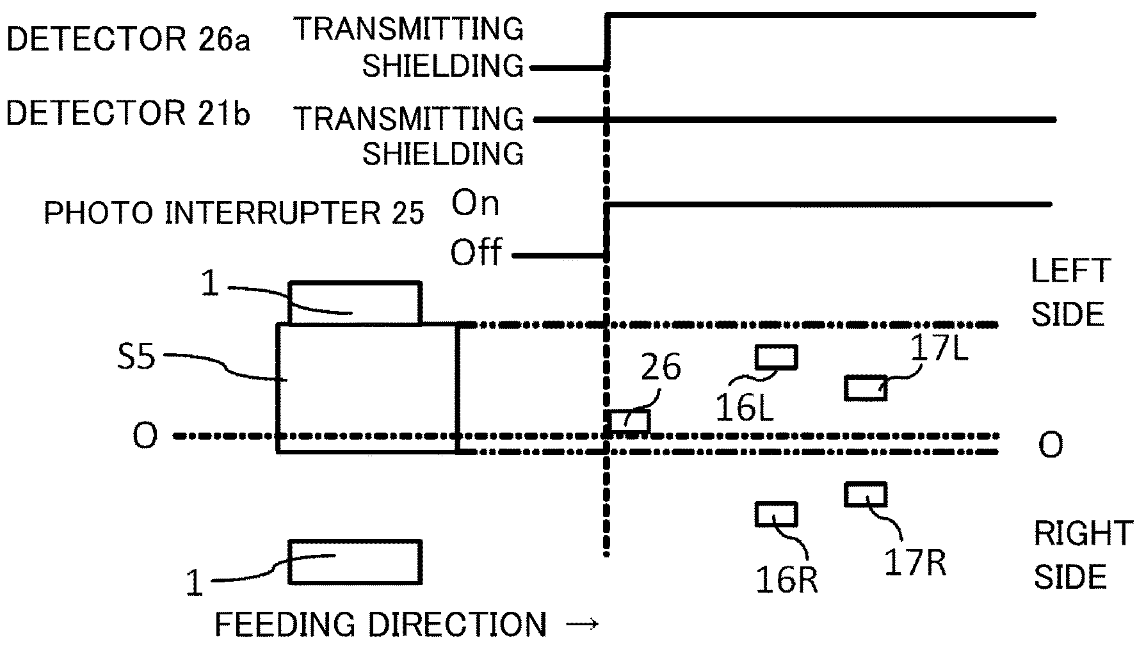

Parts (a) and (b) of FIG. 8 are timing charts of the sheet material size detecting mechanism during one side shifted feeding according to the second embodiment.

DESCRIPTION OF THE EMBODIMENTS

In the following, embodiments of the present invention will be specifically described with reference to Figures by the embodiments. Further, in the following description, width of the sheet material is referred to as a sheet width. Width is length of the sheet material in a direction which is perpendicular to a feeding direction of the sheet material (width direction).

A maximum width among paper widths which is capable of forming image, or in other words, capable of feeding, in the image forming apparatus is referred to as a maximum sheet passage width. In contrast to the sheet material of the maximum sheet passage width, a sheet with a narrow paper width is referred to as a small size paper.

A portion in the fixing device in which the small size paper does not pass through is referred to as a non-sheet passing portion. A portion in the fixing device in which the small size paper passes through is referred to as a sheet passing portion.

Defining center as a standard with respect to the width direction while feeding the sheet material is referred to as center standard feeding. Incidentally, defining a side of the sheet material on one end (for example, left side) or the other end (for example, right side) with respect to the width direction as a standard while feeding the sheet material is referred to as one side shifted feeding.

In contrast to the small size paper, sheet material with a wider paper width is referred to as a large size paper. Sheet material with a paper width in between that of the large size paper and the small size paper is referred to as a medium size paper.

An interval between the sheet materials is length from a trailing end of the sheet material to a leading end of the sheet material which is fed next, and is also referred to as a sheet interval. Further, the interval between the sheet materials may also refer to a time (also referred to as a time interval) which corresponds to an interval which is based on feeding speed of the sheet material. Thus, widening the interval between the sheet materials (increasing the interval) means delaying timing for feeding the sheet material which is fed next.

First Embodiment

[Image Forming Apparatus]

Figure 1:
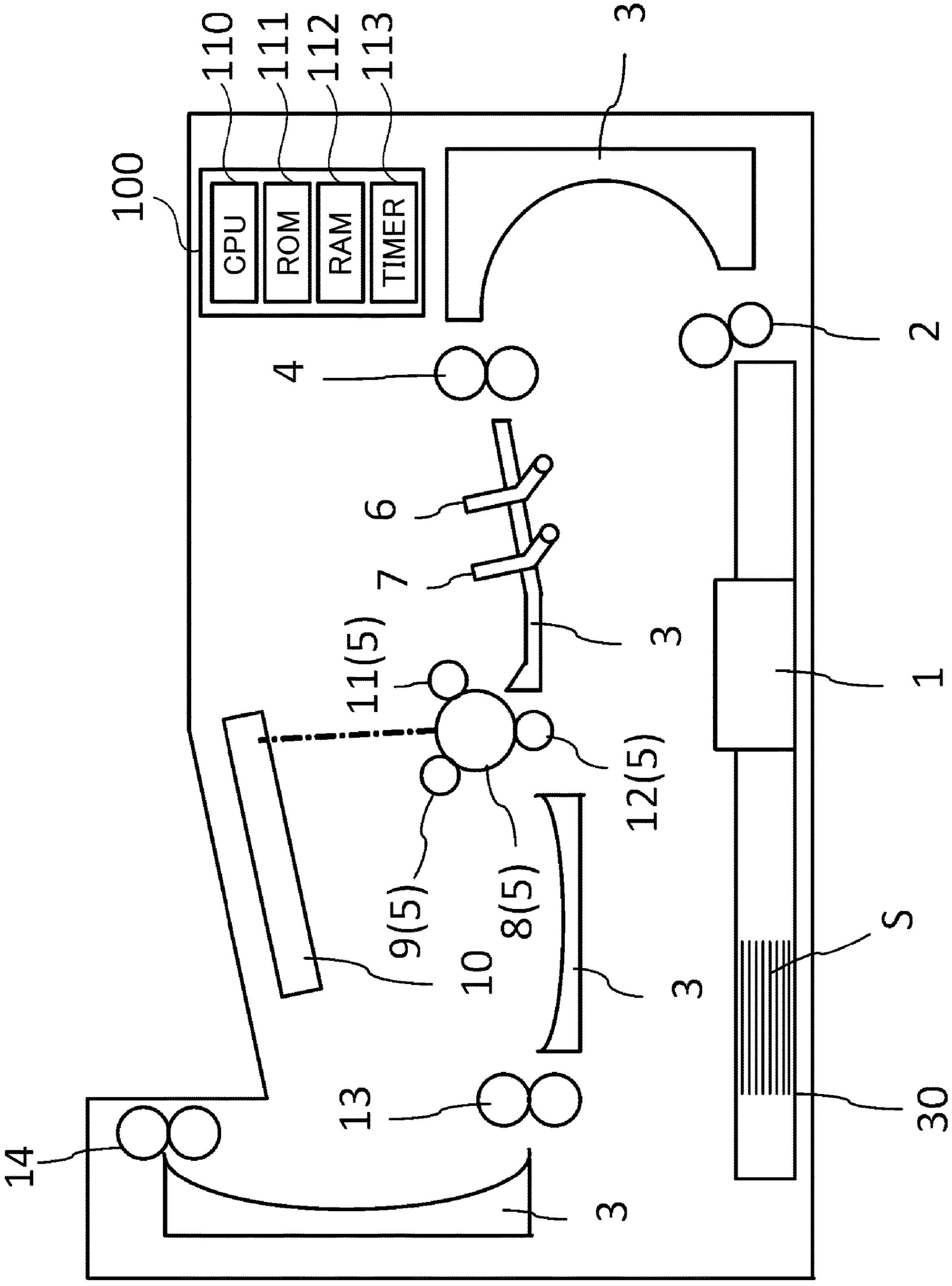
FIG. 1 is a sectional view of an image forming apparatus according to a first embodiment and a second embodiment.

FIG. 1 is a sectional view of the image forming apparatus in the first embodiment. The sheet material S is regulated to be arranged in a center with respect to the width direction of the sheet material S and fed by width regulating guides 1 which are width regulating members, and is stacked in the stacking portion 30. The sheet material S is separated one sheet by one sheet by a feeding portion 2, and is fed to a conveying portion 4 along a feeding guide 3 which forms a feeding passage through which the sheet material S passes. The sheet material S is fed to an image forming portion 5 by the conveying portion 4.

In the embodiment, the width regulating guides 1 are configured to interlock with each other. One width regulating guide 1 and the other width regulating guide 1 are connected, and when one width regulating guide 1 is moved outward with respect to the width direction, the other width regulating guide 1 also moves outward with respect to the width direction. By a pair of the width regulating guides 1 (a width regulating member pair), a center of the sheet material corresponds to a center of the feeding passage with respect to the width direction. That is, with respect to the width direction, the center of the feeding passage corresponds to the center of the pair of the width regulating guides 1. A center with respect to the width direction may mean a position which divides the distance between a pair of the width regulating guides 1 into two equal parts.

A detecting portion 6, which is a detecting means, is arranged on an upstream side of the image forming portion 5 with respect to the feeding direction, and the timing of image forming is controlled based on a result which is detected by the detecting portion 6. Further, a detecting portion 7, which is a first contact means and a second contact means, is arranged on a downstream side of the detecting portion 6 with respect to the feeding direction, the width of the sheet material S is detected by the detecting portion 7, and control is performed according to the width of the sheet material S based on a result which is detected by the detecting portion 7.

In the image forming portion 5, which forms an image on the sheet material S, a charging roller 9 charges a photosensitive drum 8, and a latent image is formed on the photosensitive drum 8 by a laser unit 10. A developing roller 11 develops the latent image on the photosensitive drum 8 and forms a toner image. The toner image which is formed is transferred to the sheet material S by a transfer roller 12. The sheet material S onto which the toner image is transferred is heated and pressed by a fixing portion 13 and the unfixed toner image is fixed to the sheet material S. After that, the sheet material S is fed to a discharging portion 14 along the feeding guide 3, and the sheet material S is discharged outside a main assembly of the image forming apparatus. The image forming apparatus feeds the next sheet material S and forms an image continuously at intervals according to length (length with respect to the feeding direction) of the sheet material S which is detected by the detecting portion 6 and width of the sheet material S which is detected by the detecting portion 7. Incidentally, a method of controlling which feeds the sheet material S at intervals according to the width of the sheet material S is well known and its description will be omitted.

A control portion 100 includes a CPU 110, a ROM 111, a RAM 112, and a timer 113. The CPU 110 executes various programs which are stored in the ROM 111 and control the image forming apparatus, while using the RAM 112 as a temporary work area and referring to the timer 113. The control portion 100 detects the width of the sheet material S which is fed, based on the results which are detected by the detecting portions 6 and 7.

In this way, by detecting the width of the sheet material S, it is possible to make a space which corresponds to the width of the sheet material S, even in a case that the small size paper is fed. Thus, it is possible to form an image continuously by reducing temperature of the non-sheet passing portion in the fixing portion 13 without causing the fixing portion 13 to become excessively high temperature. Incidentally, the image forming apparatus is not limited to a configuration which is shown in FIG. 1, and may be, for example, a color image forming apparatus.

In the embodiment, the feeding portion 2, the conveying portion 4, the photosensitive drum 8, the fixing portion 13, and the discharging portion 14 have a function as a feeding member which feeds the sheet material S. The feeding portion 2, the conveying portion 4, the photosensitive drum 8, the fixing portion 13, and the discharging portion 14 are configured to be rotatable around rotational axes respectively. In the embodiment, a direction of a rotational axis of the feeding portion 2, a direction of a rotational axis of the conveying portion 4, a direction of a rotational axis of the photosensitive drum 8, a direction of a rotational axis of the fixing portion 13, a direction of a rotational axis of the discharging portion 14 and the width direction are parallel to each other. Throughput is the number of the sheets S per unit time which is fed by the feeding member. In the embodiment, reducing the throughput means widening an interval between the leading sheet material S and the trailing sheet material S. Incidentally, it is also possible to reduce the throughput by reducing the feeding speed of the feeding member.

[A Mechanism for Detecting the Width of the Sheet Material]

Figure 2:
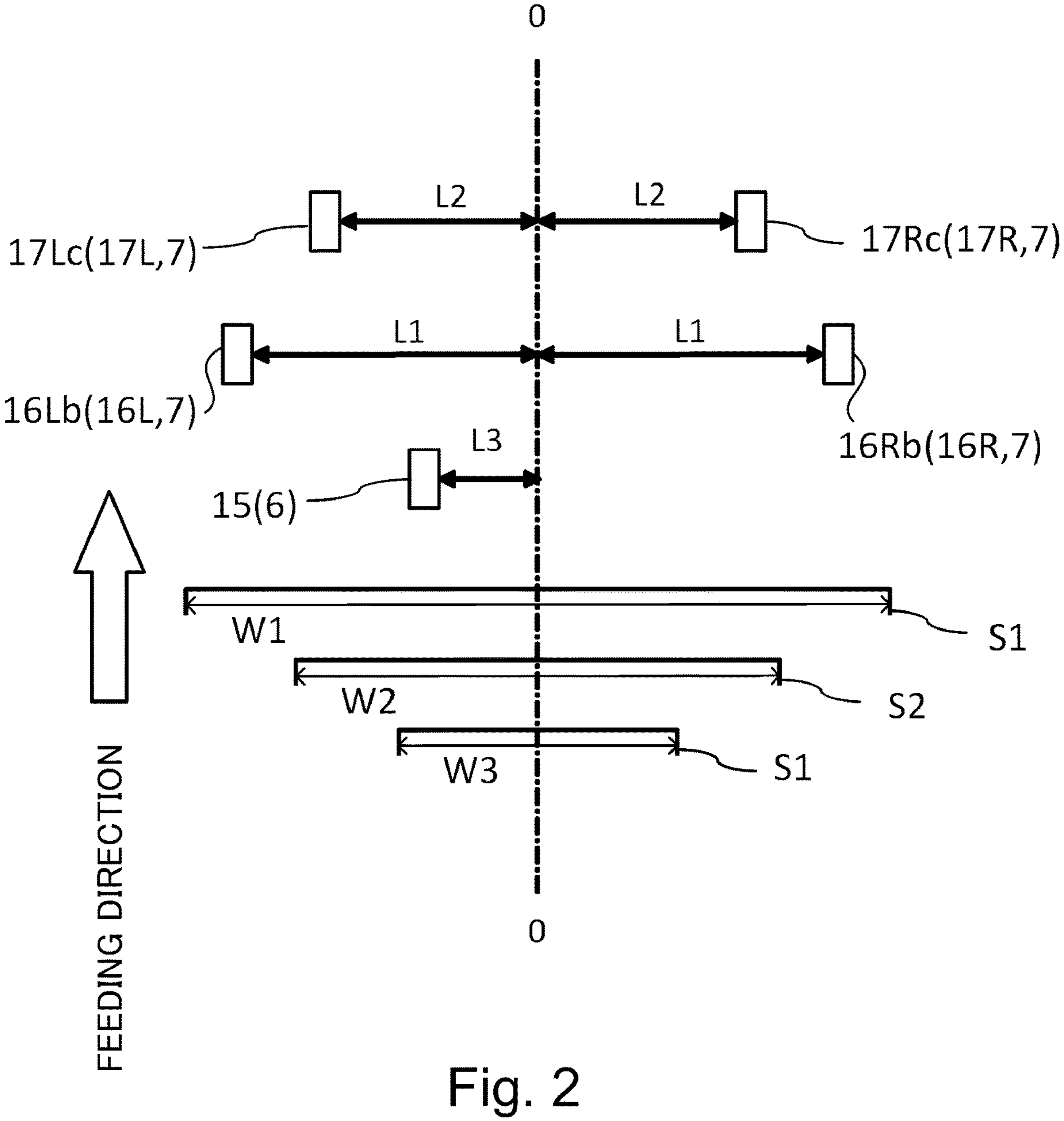
FIG. 2 is a schematic view of a feeding passage for a sheet material according to the first embodiment and the second embodiment.

A mechanism for detecting the width of the sheet material S (hereinafter referred to as a width detecting mechanism), which is a sheet material detecting device according to the first embodiment, will be described by using from FIG. 2 through FIG. 5. FIG. 2 is a schematic view of the feeding passage of the sheet material S. Parts (a) to (c) of FIG. 3 are perspective views of the width detecting mechanism. Parts (a) to (c) of FIG. 4 are timing charts of the width detecting mechanism for the sheet material S during the center standard feeding. Parts (a) and (b) of FIG. 5 are timing charts of the width detecting mechanism for the sheet material S during the one side shifted feeding.

FIG. 2 shows a case that three sizes of the sheet materials S of the large size S1, the medium size paper S2 and the small size paper S3 are selectively fed at a standard position O-O during the center standard feeding which is indicated by one dot chain line. Arrangements of each of the sheet materials S, the detecting portion 6 and the detecting portion 7 are described by using FIG. 2. Incidentally, a width of the large size paper S1 is a width W1 which is a first width. A width of the medium size paper S2 is a width W2 which is a second width which is narrower than the first width. A width of the small size paper S3 is a width W3 which is a third width which is narrower than the second width. Furthermore, when L1, L2, and L3 which will be described below are used, a magnitude relationship with respect to the width direction is $W1>2\times L1>W2>2\times L2>W3>2\times L3$. In the embodiment, the standard position O-O corresponds to a center of the feeding passage with respect to the width direction.

Hereinafter, the detecting portion 6 is referred to as a leading end flag (an inside contact portion) 15. The leading end flag 15 is provided with the feeding passage in which the sheet material S is fed and is included in a detecting means for detecting presence or absence of the sheet material S. Further, the detecting portion 7 includes a large size flag pair which is a second contact means, and a medium size flag pair which is a first contact means.

The large size flag pair includes a large size flag 16L and a large size flag 16R. The medium size flag pair includes a medium size flag 17L and a medium size flag 17R. The large size flag 16L is arranged symmetrically with the large size flag 16R with respect to the center of the width direction (the center of the feeding passage), and the medium size flag 17L is arranged symmetrically with the medium size flag 17R with respect to the center of the width direction (the center of the feeding passage). With respect to the width direction, the large size flag 16L and the medium size flag 17L are arranged on one side of the center of the feeding passage, and the large size flag 16R and the medium size flag 17R are arranged on the other side of the center of the feeding passage. The large size flag 16L is arranged outside of the medium size flag 17L with respect to the center of the width direction, and the large size flag 16R is arranged outside of the medium size flag 17R with respect to the center of the width direction.

As shown in parts (a) to (c) of FIG. 3, the medium size flag 17L includes a protrusion 17Lc which is a first contact portion, and the medium size flag 17R includes a protrusion 17Rc which is a second contact portion. The large size flag 16L includes a protrusion 16Lb which is a third contact portion, and the large size flag 16R includes a protrusion 16Rb which is a fourth contact portion. The protrusion 16Lb, the protrusion 16Rb, the protrusion 17Lc and the protrusion 17Rc are contact portions which are possible to contact with the sheet material S.

As shown in FIG. 2, the protrusion 16Lb and the protrusion 16Rb are arranged symmetrically with respect to the standard position O-O at a distance L1 (for example, approximately 95 mm) from the standard position O-O toward an outside with respect to the width direction. The protrusion 16Lb and the protrusion 16Rb are arranged upstream of the protrusion 17Lc and the protrusion 17Rc with respect to the feeding direction. Further, the protrusion 16Rb is arranged symmetrically with the protrusion 16Lb with respect to the center of the width direction. The protrusion 17Rc is arranged symmetrically with the protrusion 17Lc with respect to the center of the width direction.

The protrusion 16Lb is arranged on one side of the center of the feeding passage with respect to the width direction, and are arranged outside of the protrusion 17Lc with respect to the center of the passage. The protrusion 16Rb is arranged on the other side of the center of the feeding passage with respect to the width direction, and are arranged outside of the protrusion 17Rc with respect to the center of the passage.

The protrusion 17Lc and the protrusion 17Rc are arranged symmetrically with respect to the standard position O-O at a distance L2 (for example, approximately 64 mm) from the standard position O-O toward an outside with respect to the width direction. An object of this is to detect, for example, A4 (210 mm in width) and A5 (148 mm width) as a size of the sheet material S in the market in general. Therefore, a specific value may be changed according to the paper width of the sheet material S which is used for the image forming apparatus.

The protrusion 17Lc is arranged outside of the leading end flag 15 with respect to the width direction. Further, the protrusion 17Rc is arranged symmetrically with the protrusion 17Lc with respect to the center of the width direction. The protrusion 17Lc is arranged on one side of the center of the feeding passage with respect to the width direction. The protrusion 17Rc is arranged on the other side of the center of the feeding passage with respect to the width direction. The leading end flag 15 is positioned between the protrusion 17Lc and the protrusion 17Rc with respect to the width direction.

The medium size flag 17L becomes in a first state in interrelation with the large size flag 16L when the large size flag 16L becomes in the first state, and the medium size flag 17R becomes in the first state in interrelation with the large size flag 16R when the large size flag 16R becomes in the first state. On the other hand, the medium size flag 17L is possible to become in the first state while the large size flag 16L is in a second state, and the medium size flag 17R is possible to become in the first state while the large size flag 16R is in the second state.

Here, the first state is a state when the flag contacts with the sheet material S, and the second state is a state when the flag does not contact with the sheet material S. When each flag is in the second state, each flag is in a state of being protruded toward the feeding passage, and each flag transitions to the first state when each flag contacts with the sheet material S.

Specifically, when the medium size flag 17L is in the second state, the protrusion 17Lc is positioned in a first standby position, and when the protrusion 17Lc contacts the sheet material S and moves from the first standby position to a first operating position, the medium size flag 17L transitions to the first state. When the medium size flag 17R is in the second state, the protrusion 17Rc is positioned in a second standby position, and when the protrusion 17Rc contacts the sheet material S and moves from the second standby position to a second operating position, the medium size flag 17R transitions to the first state. When the large size flag 16L is in the second state, the protrusion 16Lb is positioned in a third standby position, and when the protrusion 16Lb contacts the sheet material S and moves from the third standby position to a third operating position, the medium size flag 16L transitions to the first state. When the large size flag 16R is in the second state, the protrusion 16Rb is positioned in a fourth standby position, and when the protrusion 16Rb contacts the sheet material S and moves from the fourth standby position to a fourth operating position, the medium size flag 16R transitions to the first state.

In other words, when the medium size flag 17L is in the second state, the protrusion 17Lc is positioned in the first standby position, and when the medium size flag 17L is in the first state, the protrusion 17Lc is positioned in the first operating position. That is, the protrusion 17Lc is capable of moving between the first standby position and the first operating position. Similarly, when the medium size flag 17R is in the second state, the protrusion 17Rc is positioned in the second standby position, and when the medium size flag 17R is in the first state, the protrusion 17Rc is positioned in the second operating position. That is, the protrusion 17Rc is capable of moving between the second standby position and the second operating position.

When the large size flag 16L is in the second state, the protrusion 16Lb is positioned in the third standby position, and when the large size flag 16L is in the first state, the protrusion 16Lb is positioned in the third operating position. That is, the protrusion 16Lb is capable of moving between the third standby position and the third operating position. Similarly, when the large size flag 16R is in the second state, the protrusion 16Rb is positioned in the fourth standby position, and when the large size flag 16R is in the first state, the protrusion 16Rb is positioned in the fourth operating position. That is, the protrusion 16Rb is capable of moving between the fourth standby position and the fourth operating position.

As will be described below, when the protrusion 16Lb moves from the third standby position to the third operating position, the large size flag 16L moves the medium size flag 17L so that the protrusion 17Lc moves from the first standby position to the first operating position. When the protrusion 16Rb moves from the fourth standby position to the fourth operating position, the large size flag 16R moves the medium size flag 17R so that the protrusion 17Rc moves from the second standby position to the second operating position. In other words, when the protrusion 16Lb moves from the third standby position to the third operating position, the protrusion 17Lc is moved from the first standby position to the first operating position. When the protrusion 16Rb moves from the fourth standby position to the fourth operating position, the protrusion 17Rc is moved from the second standby position to the second operating position.

The medium size flag 17L and the medium size flag 17R are symmetrical in shape and have similar functions. The large size flag 16L and the large size flag 16R are symmetrical in shape and have similar functions. In following descriptions, characters L and R of reference numerals may be omitted except when left and right are identified. For example, in a case that the protrusion 16Lb and the protrusion 16Rb are described regardless of right and left, L and R may be omitted such as a protrusion 16*b*.

Further, in order to detect the leading end of the sheet material S, the leading end flag 15 is arranged on one side with respect to the standard position O-O as a standard at a distance L3 (for example, approximately 30 mm) from the standard position O-O toward an outside with respect to the width direction. For example, in the first embodiment, the leading end flag 15 is arranged on a side in which the large size flag 16L and the medium size flag 17L are arranged. An object of this is to detect the sheet material S which is the smallest size which corresponds to the image forming apparatus. That is, the leading end flag 15 is capable of detecting all types of the sheet material S in which the image forming apparatus is possible to feed. Further, the leading end flag 15 is arranged on an upstream side with respect to the feeding direction, the large size flag 16 is arranged on a downstream side of the leading end flag 15 with respect to the feeding direction, and the medium size flag 17 is arranged on a downstream side of the large size flag 16 with respect to the feeding direction.

As described above, a width W1 of the large size paper S1 is greater than a distance (=2×L1) between the protrusion 16Lb and the protrusion 16Rb of left and right. A width W2 of the medium size paper S2 is less than or equal to the distance (=2×L1) between the protrusion 16Lb and the protrusion 16Rb and greater than a distance (=2×L2) between the protrusion 17Lc and the protrusion 17Rc. A width W3 of the small size paper S3 is less than or equal to the distance (=2×L2) between the protrusion 17Lc and the protrusion 17Rc and is greater than twice a distance (=2×L3) between the leading end flag 15 and the standard position O-O.

[Operation of a Width Detecting Mechanism]

Next, an operation of a width detecting mechanism will be described by using parts (a) to (c) of FIG. 3. The leading end flag 15 is held in a position which is shown in part (a) of FIG. 3 in which a leading end of the leading end flag 15 protrudes from the feeding guide 3 (see FIG. 1) by a spring 18 (hereinafter referred to as a “standby position”). Since the leading end of the leading end flag 15 protrudes from the feeding guide 3, it interferes with the sheet material S which is fed. When the sheet material S contacts with the leading end flag 15, the leading end flag 15 is pushed by the sheet material S and swingably moves to a position which is shown in part (b) of FIG. 3 (hereinafter referred to as a “detecting position”).

The leading end flag 15 includes a detecting portion 15*a*, and the detecting portion 15*a* shields light of the photo interrupter 23 at the standby position (part (a) of FIG. 3), and transmits the light of the photo interrupter 23 at the detecting position (part (b) of FIG. 3). When the leading end flag 15 swingably moves, the detecting portion 15*a* also swingably moves in interrelation with the leading end flag 15, and the photo interrupter 23 is switched between a light shielding state and a light transmitting state. When the light of the photo interrupter 23 is shielded, there is no sheet material S in feeding guide 3 (hereinafter referred to as “no paper”) and this state is defined as Off. On the other hand, when the light of the photo interrupter 23 is transmitted, there is the sheet material S in the feeding guide 3 (hereinafter referred to as “paper is present”), and this state is defined as On. The leading end flag 15 functions as a fifth contact portion (an inside contact portion) which is in the first state or the second state, and the photo interrupter 23 detects that paper is present when the fifth contact portion is in the first state and functions as a first detecting portion which detects no paper while the fifth contact portion is in the second state. The leading end flag 15 which is a fifth contact portion and the photo interrupter 23 which is a first detecting portion are included in the detecting means.

The large size flag 16 is held at the standby position in which a leading end of the large size flag 16 protrudes from the feeding guide 3 by a spring 19 (part (a) of FIG. 3). That is, the large size flag 16R and the large size flag 16L are in the second state. In this state, the protrusion 16Lb and the protrusion 16Rb protrude into the feeding passage. When the sheet material S contacts with the protrusion 16*b* of the large size flag 16, the large size flag 16 swingably moves to the detecting position. That is, the large size flags 16 (16L, 16R) are in the first state. The large size flag 16R and the large size flag 16L include contact portions 16La and 16Ra. The large size flag 16 does not contact with the medium size flag 17 at the standby position. On the other hand, when swingably moving to the detecting position, the contacting portion 16La of the large size flag 16L contacts with the contact portion 17La in which the medium size flag 17L includes, and swingably moves the medium size flag 17 to the detecting position (part (b) of FIG. 3). When swingably moving to the detecting position, the contacting portion 16Ra of the large size flag 16R contacts with the contact portion 17Ra in which the medium size flag 17R includes, and swingably moves the medium size flag 17 to the detecting position (part (b) of FIG. 3). The contact portions 16La and 16Ra have a function as a force applying portion which presses the contact portions (force receiving portions) 17La and 17Ra.

On the other hand, when the medium size flag 17 moves from the standby position to the detecting portion, the contact portions 17*a* (17La, 17Ra) moves in a direction away from the contact portions 16*a* (16La, 16Ra). In this way, the medium size flag 17 is able to move to the detecting position while the large size flag 16 is in a state at the detecting position (independently from the large flag 16).

The medium size flag 17 is held at the standby position in which a leading end of the medium size flag 17 protrudes from the feeding guide 3 by a spring 20 (part (a) of FIG. 3). That is, the medium size flag 17R and the size flag 16L are in the second state. In this state, the protrusion 17Lc and the protrusion 17Rc protrude into the feeding passage. When the sheet material S contacts with the protrusion 17*c* of the medium size flag 17, the medium size flag 17 swingably moves to the detecting position. That is, the medium size flags 17R and the medium size flags 17L are in the first state. The medium size flag 17L includes the contact portion 17La which contacts with the large size flag 16L and a contact portion 17Lb which contacts with a link 21. The medium size flag 17R includes the contact portion 17Ra which contacts with the large size flag 16R and a contact portion 17Rb which contacts with the link 21. When the medium size flag 17L swingably moves to the detecting portion, the contact portion 17Lb which contacts with the link 21 rotates in a direction away from the link 21 (part (b) of FIG. 3). When the medium size flag 17R swingably moves to the detecting portion, the contact portion 17Rb which contacts with the link 21 rotates in the direction away from the link 21 (part (b) of FIG. 3).

The link 21 is loaded by a spring 22 in a direction of contacting with the medium size flag 17. Further, the link 21 includes contact portions 21*a* (21La, 21Ra) which contact with contact portions 17*b* (17Lb, 17Rb) of the medium size flag 17. A rotational moment by an own weight of the link 21 is set to less than half of a rotational moment by the spring 20 and an own weight of the medium size flag 17. Thus, when one or both of the medium size flag 17R and the medium size flag 17L are at the standby position, the link 21 is at the standby position and is restricted from moving to the detecting position (part (a) of FIG. 3). When both of the medium size flag 17R and the medium size flag 17L swingably move to the detecting position, the link 21 swingably moves to the detecting position (part (b) of FIG. 3). The link 21 includes a detecting portion 21*b*, the light of the photo interrupter 24 is transmitted when the detecting portion 21*b* is at the standby position, and the light of the photo interrupter 24 is shielded when the detecting portion 21*b* is at the detecting position. Thus, the photo interrupter 24 detects that the link 21 swingably moves. When the light of the photo interrupter 24 is transmitted (no paper) is defined as Off, and when the light of the photo interrupter 24 is shielded (paper is present) is defined as On. The photo interrupter 24 functions as a second detecting portion which detects that there is no sheet when the link 21 is at a first position and detects that there is a sheet when the link 21 is at a second position.

The link 21 functions as a moving member which moves from the first position to the second position which is different from the first position according to states of the medium size flag 17L, the medium size flag 17R, the large size flag 16L and the large size flag 16R. Here, the first position is at the standby position which is described above, and the second position is at the detecting position. The link 21 moves from the first position to the second position when both of the medium size flag 17L and the medium size flag 17R are in the first state. Further, since the medium size flags 17L and 17R become in the first state in interrelation with the large size flags 16L and 16R, when the large size flags 16L and 16R become in the first state, the link 21 moves from the first position to the second position.

That is, when the contact portions 17*b* (17Lb, 17Rb) of the medium size flag 17 contact with the contact portions 21*a* (21La, 21Ra), the link 21 is restricted from moving. The contact portions 17*b* (17Lb, 17Rb) of the medium size flag 17 has a function as a regulating portion (a movement regulating portion) which regulates a movement of the link 21 by contacting with the contact portions 21*a* (21La, 21Ra) as a regulated portion. In a case that the protrusion 17Lc moves to the first operating position and the protrusion 17Rc moves to the second operating position, the link 21 is capable of moving from the first position to the second position which is different from the first position. In a case that the protrusion 17Lc is positioned at the first standby position and/or in a case that the protrusion 17Rc is positioned at the second standby position, the link 21 is regulated to move from the first position to the second position.

[During the Center Standard Feeding]

Next, a timing chart of each sensor flag and each photo interrupter in a case that the sheet material S is fed based on the center standard will be described by using parts (a) to (c) of FIG. 4. In parts (a) to (c) of FIG. 4, a top one shows a state of the photo interrupter 23 (On (high level), Off (low level)), and a second one shows a state of the photo interrupter 24 (On (high level), Off (low level)). Further, a bottom one shows a positional relationship between the sheet materials S (from S1 through S3) and each flag (from 15 through 17). A one dot chain line shows the standard position O-O, a two dot chain line shows a locus in which the sheet material S passes in the feeding direction, and a broken line shows a timing at which an output of each of the photo interrupters 23 and 24 is switched. A left side and a right side show left and right when it is viewed from an upstream side with respect to the feeding direction. In a following description, it is assumed that all of the sheet materials are fed at a same feeding speed. In parts (a) to (c) of FIG. 4, reference numerals 16L, 16R, 17L and 17R represent positions of the protrusion 16Lb, the protrusion 16Rb, the protrusion 17Lc and the protrusion 17Rc, respectively.

(Large Size Paper)

In a case that the large size paper S1 is fed based on the center standard, the large size paper S1 contacts with the leading end flag 15 and the photo interrupter 23 switches from Off to On. When the large size paper S1 moves downstream with respect to the feeding direction, the large size paper S1 contacts with the large size flag 16L and the large size flag 16R which are positioned on left and right with respect to the width direction. Thus, the left and right large size flags 16L and 16R swingably move, and in interrelation with this, the left and right medium size flags 17L and 17R swingably move. When both of the left and right medium size flags 17L and 17R swingably move, the link 21 swingably moves and the photo interrupter 24 switches from Off to On. A time from a timing when the photo interrupter 23 becomes On to a timing when the photo interrupter 24 becomes On is defined as T1 (part (a) of FIG. 4).

(Medium Size Paper)

When the medium size paper S2 is fed based on the center standard, the medium size paper S2 contacts with the leading end flag 15 and the photo interrupter 23 switches from Off to On. The medium size paper S2 moves downstream with respect to the feeding direction. Since the width of the medium size paper S2 is positioned inner side than positions in which the two large size flags 16L and 16R are arranged, the medium size paper S2 does not contact with the large size flags 16L and 16R. When the medium size paper S2 moves furthermore downstream with respect to the feeding direction, the medium size paper S2 contacts with the medium size flags 17L and 17R which are positioned left and right with respect to the width direction. Thus, the left and right medium size flags 17L and 17R swingably move. When both of the left and right medium size flags 17L and 17R swingably move, the link 21 swingably moves and the photo interrupter 24 switches from Off to On. A time from a timing when the photo interrupter 23 becomes On to a timing when the photo interrupter 24 becomes On is defined as T2. To an extent that the medium size flags 17L and 17R are arranged downstream of the large size flags 16L and 16R with respect to the feeding direction, the photo interrupter 24 switches On at a later timing for the medium size paper S2 than for the large size paper S1. Thus, the time T2 is longer than the time T1 (part (b) of FIG. 4) (T2>T1).

(Small Size Paper)

In a case that the small size paper S3 is fed based on the center standard, the small size paper S3 contacts with the leading end flag 15 and the photo interrupter 23 switches from Off to On. The small size paper S3 moves downstream with respect to the feeding direction, however, since the width of the small size paper S3 is positioned inner side than positions in which the large size flags 16L and 16R are arranged, the small size paper S3 does not contact with the large size flags 16L and 16R. The small size paper S3 moves furthermore downstream with respect to the feeding direction, however, since the width of the small size paper S3 is positioned inner side than positions in which the medium size flags 17L and 17R are arranged, the small size paper S3 does not also contact with the medium size flags 17L and 17R. That is, when the small size paper S3 is fed based on the center standard, the photo interrupter 24 remains a state of Off (the photo interrupter 24 does not become On) (part (c) of FIG. 4). A trailing end of the small size paper S3 passes through (go through) the leading end flag 15 while the photo interrupter 24 is Off. Thus, the photo interrupter 23 switches from On to Off. As described above, it is possible to detect a size of the sheet material S with respect to the width direction from a time in which the photo interrupter 23 and the photo interrupter 24 detect.

The control portion 100 determines that a sheet is the large size paper S1 based on the time T1 between a timing when the leading end flag 15 detects that the sheet is present and a timing when both of the large size flags 16L and 16R become in the first state and then the link 21 moves to the second position. The control portion 100 determines that a sheet is the medium size paper S2 based on the time T2 between a timing when the leading end flag 15 detects that the sheet is present and a timing when both of the medium size flags 17L and 17R become in the first state and then the link 21 moves to the second position. The control portion 100 determines that a sheet is the small size paper S3 based on a time between a timing when the leading end flag 15 detects that the sheet is present and a timing when the link 21 does not move to the second position and the leading end flag 15 detects that there is no sheet. Here, the timing when the leading end flag 15 detects that a sheet is present is defined as a timing when a leading end of the sheet material S reaches the leading end flag 15. The timing when the leading flag 15 detects that there is no sheet is defined as a timing when a trailing end of the sheet S passes through (go through) the leading end flag 15. The control portion 100 functions as a determining means which determines the width of the sheet material S based on a detection result by the leading end flag 15 and a position of the link 21.

In the embodiment, the number of the sheets S which are fed by the feeding member per unit time changes according to a size of the sheet material S which is detected. Specifically, when the control portion 100 determines that the sheet material S is the large size paper S1, the control portion 100 controls the feeding member so that an interval of the sheet material S is a first interval and the throughput is a first amount. When the control portion 100 determines that the sheet material S is the medium size paper S2, the control portion 100 controls the feeding member so that the interval of the sheet material S is a second interval and the throughput is a second amount. When the control portion 100 determines that the sheet material S is the small size paper S3, the control portion 100 controls the feeding member so that the interval of the sheet material S is a third interval and the throughput is a third amount. The second amount is less than the first amount and the third amount is less than the second amount. The second interval is longer than the first interval and the third interval is longer than the second interval.

[During One Side Shifted Feeding]

Next, a timing chart of each flag and each photo interrupter when the sheet material S is fed in a one side shifted feeding, while the width regulating guide 1 is maintained at its maximum width position will be described by using parts (a) and (b) of FIG. 5. Incidentally, parts (a) and (b) of FIG. 5 are similar to parts (a) to (c) of FIG. 4. Originally, since the image forming apparatus feeds a sheet based on a center standard, this type of feeding is not normally performed. However, it is possible that the sheet material S is fed in a one side shifted feeding, specifically a left side shifted or a right side shifted, by the width of the large size paper S1 due to erroneous operation, as shown in parts (a) and (b) of FIG. 5. In a description of the first embodiment, a case of the left side shifted is described, however, a case of the right side shifted is similar to the case of the left side shifted except only left and right are reversed. In parts (a) and (b) of FIG. 5, the reference numerals 16L, 16R, 17L and 17R represent positions of the protrusion 16Lb, the protrusion 16Rb, the protrusion 17Lc and the protrusion 17Rc, respectively.

[During One Side Shifted Feeding of the Sheet Material S4]

The sheet material S4 is a sheet material whose width is such that the sheet material S4 contacts with the large size flag 16L, but does not contact with the large size flag 16R and contacts with both of the medium size flag 17L and the medium size flag 17R, for example, when the sheet material S4 is fed in left side shifted feeding. Incidentally, in a case that the sheet material S4 is fed in right side shifted feeding, the left and right sides are reversed from the case which is described above. In a case the sheet material S4 is fed in right side shifted feeding, the sheet material S4 contacts with the leading end flag 15, and the photo interrupter 23 switches from Off to On. The sheet material S4 moves downstream with respect to the feeding direction, however, the sheet material S4 is closer to a left side. Therefore, the sheet material S4 contacts with the large size flag 16L on the left side, however, the sheet material S4 does not contact with the large size flag 16R. That is, the large size flag 16L on the left side swingably moves, and in interrelation with this, the medium size flag 17L on the left side swingably moves, however, since the large size flag 16R on the right side does not swingably move, the medium size flag 17R on the right side does not swingably move either. Therefore, the link 21 does not swingably move since only the medium size flag 17 on one side moves to the detecting position. That is, at this point, the photo interrupter 24 remains Off.

When the sheet material S4 moves furthermore downstream with respect to the feeding direction, the sheet material S4 contacts with the medium size flag 17R on the right side and the medium size flag 17R on the right side swingably moves. Since the medium size flag 17L on the left side has already moved to the detecting position, when the medium size flag 17R on the right side swingably moves, the link 21 swingably moves and the photo interrupter 24 switches from Off to On. A time from a timing when the photo interrupter 23 becomes On to a timing when the photo interrupter 24 becomes On is defined as T3. The time T3 becomes a same as the time T2 in part (b) of FIG. 4, and the image forming apparatus detects that the sheet material S4 is the medium size paper. Since the sheet material S4 is closer to the left side when the sheet material S4 passes through the fixing portion 13, the region of the non-sheet passing portion on the right side is larger compared to a case of the center standard feeding. The region of the non-sheet passing portion which occurs on the right side when the sheet material S4 passes through the fixing portion 13 is same as when the medium size paper S2 is fed. Therefore, even when the sheet material S4 is detected as the medium size paper, in terms of reducing temperature rise of the non-sheet passing portion, it does not matter that the interval of the sheet material S which is fed is controlled in a same way as in a case of the medium size paper S2.

[During One Side Shifted Feeding of the Sheet Material S5]

The sheet material S5 is a sheet material whose width is such that the sheet material S5 contacts with the large size flag 16L and the medium size flag 17L, but does not contact with the large size flag 16R and the medium size flag 17R, for example, when the sheet material S5 is fed in the left side shifted feeding. Incidentally, in a case that the sheet material S5 is fed in right side shifted feeding, the left and right sides are reversed from the case which is described above. In a case that the sheet material S5 is fed in the left side shifted feeding, the sheet material S5 contacts with the leading end flag 15 and the photo interrupter 23 switches from Off to On. The sheet material S5 moves downstream with respect to the feeding direction, however, the sheet material S5 is closer to the left side. Therefore, the sheet material S5 contacts with the large size flag 16L on the left side, however, the sheet material S5 does not contact with the large size flag 16 R. That is, the large size flag 16L on the left side swingably moves, and in interrelation with this, the medium size flag 17L on the left side swingably moves, however, since the large size flag 16R on the right side does not swingably move, the medium size flag 17R on the right side does not swingably move either. Therefore, the link 21 does not move since only the medium size flag 17 on one side swingably moves to the detecting position. That is, the photo interrupter 24 remains Off.

The sheet material S5 moves furthermore downstream with respect to the feeding direction, however, a right end of the sheet material S5 is closer to the left side than the medium size flag 17R on the right side, the sheet material S5 does not contact with the medium size flag 17R. That is, the photo interrupter 24 remains the state of Off (part (b) of FIG. 5). Thus, only the photo interrupter 23 becomes On, so the image forming apparatus is possible to detect the sheet material S5 as the small size paper. Since the sheet material S5 is closer to the left side when the sheet material S5 passes through the fixing portion 13, the region of the non-sheet passing portion on the right side is larger compared to the case of the center standard feeding. The region of the non-sheet passing portion which occurs on the right side when the sheet material S5 passes through the fixing portion 13 is same as when the small size paper S3 is fed. Therefore, even when the sheet material S5 is detected as the small size paper, in terms of reducing the temperature rise of the non-sheet passing portion, it does not matter that the interval of the sheet material S which is fed is controlled in the same way as in a case of the small size paper S3.

In this way, it is possible to detect the width of the sheet material S and a position of an end portion of the sheet material S in stages by two of the photo interrupters, and it is possible to automatically select the interval during feeding of the sheet material which is suitable for the position of the end portion of the multiple sheet materials S at a minimum cost. Further, the image forming apparatus is capable of automatically detecting the width of the sheet material S and the end portion of the right side (or the end portion of the left side) of the sheet material S even in a case in which a user accidentally feeds any of the sheet material S which is different from the large size paper while the width regulating guide 1 is set as the width of the large size paper. That is, it is possible to increase productivity without lowering the throughput of the image forming apparatus more than necessary. The sheet material detecting device according to the first embodiment, is configured to detect the width of the sheet material based on a timing when the inside contact portion moves and a timing when the moving member moves from the first position to the second position. Further, the first embodiment may be the sheet material feeding device which is configured to change the number of the sheet materials which is fed by the feeding member per unit time based on a timing when the inside contact portion moves and a timing when the moving member moves from the first position to the second position.

Incidentally, in the first embodiment, the leading end flag 15 is arranged on an upstream side of the size flags (16, 17) with respect to the feeding direction, however, the leading end flag 15 may be arranged on a downstream side with respect to the feeding direction. That is, since the time T1 and the time T2 (=T3), etc. are time differences between the two of the timings, the leading end flag 15 may be upstream or downstream of the size flags (16, 17). In this way, the leading end flag 15 (the detecting portion 6) may be arranged upstream of the detecting portion 7 with respect to the feeding direction, or the leading end flag 15 (the detecting portion 6) may be arranged downstream of the detecting portion 7 with respect to the feeding direction.

Further, the size flags are arranged at the positions with respect to the width direction in which two types of A4 and A5 sizes are detected, however, the size flags may be arranged at any positions with respect to the width direction. Further, two pairs of the size flags are arranged to detect two types of the sizes, however, three or more pairs may be arranged to detect three or more types of sizes. Therefore, it is possible to provide the image forming apparatus which automatically detects the width of the sheet material at multiple stages and is highly productive, at low cost and without setting of the width regulating guide 1 by a user. Incidentally, in the first embodiment, detecting the width of the sheet material is applied to the image forming apparatus, however, it may also be applied to document reading apparatuses or other apparatuses which include a feeding device of the sheet material.

As described above, according to the first embodiment, it is possible to detect the size of the sheet material which is fed at low cost and accurately.

Second Embodiment

[Operation of the Width Detecting Mechanism]

A second embodiment will be described by using FIG. 6 through FIG. 8. Incidentally, a description of common contents to the first embodiment will be omitted. The leading end flag 26 is held at the standby position in which the leading end of the leading end flag 26 protrudes from the feeding guide 3 by the spring 18 (part (a) of FIG. 6). When the sheet material S contacts with the leading end flag 26, the leading end flag 26 swingably moves to the detecting position (part (b) of FIG. 6). The leading end flag 26 includes a detecting portion 26*a*. When the leading end flag 26 is at the standby position, the detecting portion 26*a* shields light of the photo interrupter 25, and when the leading end flag 26 is at the detecting position, the detecting portion 26*a* transmits the light of the photo interrupter 25, so swingable movement of the leading end flag 26 is detected. A time when the light of the photo interrupter 25 is shielded is defined as Off (no paper), and a time when the light of the photo interrupter 25 is transmitted is defined as On (paper is present). The photo interrupter 25 is the second detecting portion which detects no sheet when the link 21 is in the first position and detects that a sheet is present when the link 21 is in the second position.

Since operations of the large size flag 16, the medium size flag 17, and the link 21 are same as in the first embodiment, descriptions are omitted. The link 21 includes the detecting portion 21*b*, the detecting portion 21*b* transmits the light of the photo interrupter 25 when the link 21 is at the standby position, and the detecting portion 21*b* shields the light of the photo interrupter 25 when the link 21 is at the detecting position. The photo interrupter 25 is shared with the detecting portion 26*a* in which the leading end flag 26 includes and the detecting portion 21*b* in which the link 21 includes.

[During Center Feeding]

Next, timing charts of each of the sensor flags, the detecting portion and the photo interrupter when the sheet material S is fed based on the center standard will be described by using parts (a) to (c) of FIG. 7. In parts (a) to (c) of FIG. 7, a top one shows a state of the detecting portion 26*a* (light transmitting (high level), light shielding (low level)), and a second one shows a state of the detecting portion 21*b* (light transmitting (high level), light shielding (low level)). Further, a third one shows a state of the photo interrupter 25 (On (high level), Off (low level)). Furthermore, at a bottom, positional relationships between the sheet material S (from S1 through S3) and each flag (26, 16, 17) are shown. A one dot chain line shows the standard position O-O, a two dot chain line shows a locus in which the sheet material S passes in the feeding direction, and a broken line shows a timing at which an output of the photo interrupter 25 is switched. A left side and a right side show left and right when it is viewed from an upstream side with respect to the feeding direction. In a following description, it is assumed that all of the sheet materials are fed at a same feeding speed. In parts (a) to (c) of FIG. 7, the reference numerals 16L, 16R, 17L and 17R represent positions of the protrusion 16Lb, the protrusion 16Rb, the protrusion 17Lc and the protrusion 17Rc, respectively.

(Large Size Paper)

In a case that the large size paper S1 is fed based on the center standard, the large size paper S1 contacts with the leading end flag 26 and the detecting portion 26*a* swingably moves from a light shielding position to a light transmitting position. Since the detecting portion 21*b* is at the light transmitting position, the photo interrupter 25 is switched from Off to On. When the large size paper S1 moves downstream with respect to the feeding direction, the large size paper S1 contacts with the large size flags 16L and 16R and the large size flags 16L and 16R swingably move, and in interrelation with this, the medium size flags 17L and 17R swingably move. When both of the left and right medium size flags 17L and 17R swingably move, the link 21 swingably moves and the detecting portion 21*b* swingably moves from the light transmitting position to the light shielding position. Thus, the photo interrupter 25 switches from Off to On. A time from a timing when the photo interrupter 25 becomes On to a timing when the photo interrupter 25 becomes Off is defined as T4 (part (a) of FIG. 7).

(Medium Size Paper)

In a case that the medium size paper S2 is fed based on the center standard, the medium size paper S2 contacts with the leading end flag 26 and the detecting portion 26*a* swingably moves from the light shielding position to the light transmitting position. Since the detecting portion 21*b* is at the light transmitting position, the photo interrupter 25 is switched from Off to On. The medium paper S2 moves furthermore downstream with respect to the feeding direction, since the width of the medium size paper S2 is positioned inner side than positions in which the large size flags 16L and 16R are arranged, the medium size paper S2 does not contact with the large size flags 16L and 16R. When the medium size paper S2 moves furthermore downstream with respect to the feeding direction, the medium size paper S2 contacts with the medium size flags 17L and 17R and the medium size flags 17L and 17R swingably move. When both of the left and right medium size flags 17L and 17R swingably move, the link 21 swingably moves and the detecting portion 21*b* swingably moves from the light transmitting position to the light shielding position. Thus, the photo interrupter 25 switches from On to Off. A time from a timing when the photo interrupter 25 becomes On to a timing when the photo interrupter 25 becomes Off is defined as T5. To an extent that the medium size flags 17L and 17R are arranged downstream of the large size flags 16L and 16R with respect to the feeding direction, the photo interrupter 25 switches Off at a later timing. Thus, the time T5 is longer than the time T4 (part (b) of FIG. 7) (T5>T4).

(Small Size Paper)

In a case that the small size paper S3 is fed based on the center standard, the small size paper S3 contacts with the leading end flag 26 and the detecting portion 26*a* swingably moves from the light shielding position to the light transmitting position. Since the detecting portion 21*b* is at the light transmitting position, the photo interrupter 25 is switched from Off to On. The small size paper S3 moves downstream with respect to the feeding direction, since the width of the medium size paper S3 is positioned inner side than positions in which the large size flags 16L and 16R are arranged, the small size paper S3 does not contact with the large size flags 16L and 16R. The small size paper S3 moves furthermore downstream with respect to the feeding direction, however, since the width of the small size paper S3 is positioned inner side than positions in which the medium size flags 17L and 17R are arranged, the small size paper S3 does not contact with the medium size flags 17L and 17R. That is, the photo interrupter 25 remains in a state of On until a trailing end of the small size paper S3 passes the leading end flag 26 (part (c) of FIG. 7). As described above, it is possible to detect the size of the sheet material S with respect to the width direction from a time of On, a time in which the photo interrupter 25 detects.

[During One Side Shifted Feeding]

Next, timing charts of each of the sensor flags, the detecting portion and the photo interrupter when the sheet material S is fed in one side shifted feeding while the width regulating guide 1 is maintained at its maximum width position will be described by using parts (a) and (b) of FIG. 8. Originally, since the image forming apparatus feeds the sheet based on the center standard, this type of feeding is not normally performed. However, it is possible that the sheet material S is fed in a left side shifted feeding or a right side shifted feeding due to the erroneous operation, as shown in parts (a) and (b) of FIG. 8. In a description of the second embodiment, a case of the left side shifted is described, however, a case of the right side shifted is similar to the case of the left side shifted except only left and right are reversed. Incidentally, parts (a) and (b) of FIG. 8 are similar to parts (a) to (c) of FIG. 7. In parts (a) and (b) of FIG. 8, the reference numerals 16L, 16R, 17L and 17R represent positions of the protrusion 16Lb, the protrusion 16Rb, the protrusion 17Lc and the protrusion 17Rc, respectively.

[During One Side Shifted Feeding of the Sheet Material S4]

The sheet material S4 is a sheet material whose width is such that the sheet material S4 contacts with the large size flag 16L, but does not contact with the large size flag 16R and contacts with both of the medium size flag 17L and the medium size flag 17R, for example, when the sheet material S4 is fed in the left side shifted feeding. Incidentally, in a case that the sheet material S4 is fed in right side shifted feeding, the left and right sides are reversed from the case which is described above. In a case that the sheet material S4 is fed in the left side shifted feeding, the sheet material S4 contacts with the leading end flag 26 and the detecting portion 26*a* swingably moves from the light shielding position to the light transmitting position. Since the detecting portion 21*b* is at the light transmitting position, the photo interrupter 25 is switched from Off to On. The sheet material S4 moves downstream with respect to the feeding direction, however, since a width of the sheet material S4 is positioned inner side than positions in which the large size flags 16 are arranged, the sheet material S4 contacts with the large size flag 16L on a left side and does not contact with the large size flag 16R on a right side. That is, the large size flag 16L on the left side swingably moves, and in interrelation with this, the medium size flag 17L on the left side swingably moves, however, since the large size flag 16R on the right side does not swingably move, the medium size flag 17R on the right side does not swingably move either. Therefore, the link 21 does not swingably move since only the medium size flag 17 on one side moves to the detecting position. That is, at this point, the photo interrupter 25 remains On.

When the sheet material S4 moves furthermore downstream with respect to the feeding direction, the sheet material S4 contacts with the medium size flag 17R on the right side and the medium size flag 17R on the right side swingably moves. Since the medium size flag 17L on the left side has already moved to the detecting position, when the medium size flag 17R on the right side swingably moves, the link 21 swingably moves and the detecting portion 21*b* moves from the light transmitting position to the light shielding position. Thus, the photo interrupter 25 switches from On to Off. A time from a timing when the photo interrupter 25 becomes On to a timing when the photo interrupter 25 becomes Off is defined as T6. The time T6 becomes a same as the time T5, and the image forming apparatus detects that the sheet material S4 is the medium size paper (part (a) of FIG. 8). Since the sheet material S4 is closer to the left side when the sheet material S4 passes through the fixing portion 13, the region of the non-sheet passing portion on the right side is larger compared to the case of the center standard feeding. The region of the non-sheet passing portion which occurs on the right side when the sheet material S4 passes through the fixing portion 13 is same as when the medium size paper S2 is fed. Therefore, even when the sheet material S4 is detected as the medium size paper, in terms of reducing the temperature rise of the non-sheet passing portion, it does not matter that the interval of the sheet material S which is fed is controlled in the same way as in the case of the medium size paper S2.

[During One Side Shifted Feeding of the Sheet Material S5]

The sheet material S5 is a sheet material whose width is such that the sheet material S5 contacts with the large size flag 16L and the medium size flag 17L, but does not contact with the large size flag 16R and the medium size flag 17R, for example, when the sheet material S5 is fed in the left side shifted feeding. Incidentally, in a case that the sheet material S5 is fed in right side shifted feeding, the left and right sides are reversed from the case which is described above. In a case that the sheet material S5 is fed in the left side shifted feeding, the sheet material S5 contacts with the leading end flag 26 and the detecting portion 26*a* swingably moves from the light shielding position to the light transmitting position. Since the detecting portion 21*b* is at the light transmitting position, the photo interrupter 25 is switched from Off to On. The sheet material S5 moves downstream with respect to the feeding direction, however, since a width of the sheet material S5 is positioned inner side than positions in which the large size flags 16 are arranged, the sheet material S5 contacts with the large size flag 16L on the left side and does not contact with the large size flag 16R on the right side. That is, the large size flag 16L on the left side swingably moves, and in interrelation with this, the medium size flag 17L on the left side swingably moves, however, since the large size flag 16R on the right side does not swingably move, the medium size flag 17R on the right side does not swingably move either. Therefore, the link 21 does not move since only the medium size flag 17 on one side swingably moves to the detecting position. That is, the photo interrupter 25 remains On.

The sheet material S5 moves furthermore downstream with respect to the feeding direction, however, since the right end of the sheet material S5 is inner side than the medium size flag 17R on the right side, the sheet material S5 does not contact with the medium size flag 17R. That is, the photo interrupter 25 remains the state of On (part (b) of FIG. 8). Thus, since the photo interrupter 25 maintains a state of On until a trailing end of the sheet S5 is passed, the image forming apparatus is possible to detect the sheet material S5 as the small size paper. Since the sheet material S5 is closer to the left side when the sheet material S5 passes through the fixing portion 13, the region of the non-sheet passing portion on the right side is larger compared to the case of the center standard feeding. The region of the non-sheet passing portion which occurs on the right side when the sheet material S5 passes through the fixing portion 13 is same as when the small size paper S3 is fed. Therefore, even when the sheet material S5 is detected as the small size paper, in terms of reducing the temperature rise of the non-sheet passing portion, it does not matter that the interval of the sheet material S which is fed is controlled in the same way as in the case of the small size paper S3.

In this way, in the second embodiment, it is possible to detect the width of the sheet material S and the position of the end portion of the sheet material S in stages by the one photo interrupter 25, and it is possible to automatically select a feeding interval of the sheet material S which is suitable for the position of the end portion of the multiple sheet materials S at even lower cost. Further, the image forming apparatus is capable of automatically detecting the width of the sheet material S even in a case in which a user accidentally feeds any of the sheet material S while the width regulating guide 1 is set as the width of the large size paper. That is, it is possible to increase productivity without lowering the throughput of the image forming apparatus more than necessary.

Further, the size flags are arranged at the positions with respect to the width direction in which two types of A4 and A5 sizes are detected, however, the size flags may be arranged at any positions with respect to the width direction. Further, two pairs of the size flags are arranged to detect two types of the sizes, however, three or more pairs may be arranged to detect three or more types of sizes. Further, in the second embodiment, the width detecting mechanism is applied to the image forming apparatus, however, it may also be applied to document reading apparatuses or other sheet feeding devices.

As described above, according to the second embodiment, it is possible to detect the size of the sheet material which is fed at low cost and accurately.

According to the present invention, it is possible to detect the size of the sheet material which is fed at low cost and accurately.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-168715 filed on Oct. 14, 2021, which is hereby incorporated by reference herein in its entirety.

What is claimed is:

1. A sheet material detecting device comprising:

a feeding member configured to feed a sheet material;

an inside contact portion provided in a feeding path through which the sheet material passes and configured to be movable by contacting the sheet material;

a first contact portion disposed on one side with respect to a center of the feeding path in a widthwise direction perpendicular to a feeding direction of the sheet material and configured to be movable between a first stand-by position and a first operating position;

a second contact portion disposed on the other side with respect to the center in the widthwise direction and configured to be movable between a second stand-by position and a second operating position;

a third contact portion disposed upstream of the first contact portion and the second contact portion in the feeding direction and outside of the first contact portion with respect to the center in the widthwise direction, and configured to be movable between a third stand-by position and a third operating position;

a fourth contact portion disposed upstream of the first contact portion and the second contact portion in the feeding direction and outside of the second contact portion with respect to the center in the widthwise direction, and configured to be movable between a fourth stand-by position and a fourth operating position;

a moving member configured to (i) be moved from a first position to a second position different from the first position in a case that the first contact portion is moved to the first operating position and the second contact portion is moved to the second operating position, and (ii) be restricted in movement from the first position to the second position in a case that the first contact portion is positioned in the first stand-by position and/or the second contact portion is positioned in the second stand-by position; and a controller, wherein the inside contact portion is disposed between the first contact portion and the second contact portion in the widthwise direction, wherein the first contact portion is moved from the first stand-by position to the first operating position when the third contact portion is moved from the third stand-by position to the third operating position, and the second contact portion is moved from the second stand-by position to the second operating position when the fourth contact portion is moved from the fourth stand-by position to the fourth operating position, and wherein the controller is configured to detect a width of the sheet material base on a timing of movement of the inside contact member and a timing of movement of the moving member from the first position to the second position.

2. A sheet material detecting device according to claim 1, wherein the inside contact portion is disposed upstream of the third contact portion and the fourth contact portion in the feeding direction.

3. A sheet material detecting device according to claim 1, wherein the inside contact portion is disposed downstream of the first contact portion and the second contact portion in the feeding direction.

4. A sheet material detecting device according to claim 1, wherein the controller determines that the sheet material being fed is a sheet with a first width based on a difference in time between a timing detecting the movement of the inside contact portion and a timing of movement of the moving member from the first position to the second position by becoming of both the third contact portion and the fourth contact portion a first state of contacting with the sheet material, that the sheet material being fed is a sheet with a second width narrower than the first width based on a difference in time between the timing detecting the movement of the inside contact portion and a timing of movement of the moving member from the first position to the second position by becoming of both the first contact portion and the second contact portion the first state, and that the sheet material being fed is a sheet with a third width narrower than the second width in a case in which the movement of the inside contact portion is detected and the movement of the moving member to the second position is not detected.

5. A sheet material detecting device according to claim 4, further comprising:

a first detecting portion configured to detect that the inside contact portion becomes the first state, and a second detecting portion configured to detect that the moving member moves from the first position to the second position.

6. A sheet material detecting device according to claim 4, further comprising a detecting portion configured to detect that the moving member moves from the first position to the second position, wherein the detecting portion detects that the inside contact portion becomes the first state.

7. A sheet material detecting device according to claim 1, wherein the first contact portion is movable from the first stand-by position to the first operating position in a state in which the third contact portion is positioned in the third stand-by position, and wherein the second contact portion is movable from the second stand-by position to the second operating position in a state in which the fourth contact portion is positioned in the fourth stand-by position.

8. A sheet material detecting device according to claim 1, wherein the first contact portion and the second contact portion are symmetrically disposed with respect to the center in the widthwise direction and the third contact portion and the fourth contact portion are symmetrically disposed with respect to the center in the widthwise direction.

9. An image forming apparatus comprising:

an image forming portion configured to form an image on a sheet material; and a sheet detecting device according to claim 1, wherein the sheet detecting device is provided upstream of the image forming apparatus in the feeding direction.

10. A sheet material detecting device comprising:

a feeding member configured to feed a sheet material;

an inside contact portion provided in a feeding path through which the sheet material passes and configured to be movable by contacting the sheet material;

a first contact portion disposed on one side with respect to a center of the feeding path in a widthwise direction perpendicular to a feeding direction of the sheet material and configured to be movable between a first stand-by position and a first operating position;

a second contact portion disposed on the other side with respect to the center in the widthwise direction and configured to be movable between a second stand-by position and a second operating position;

a third contact portion disposed upstream of the first contact portion and the second contact portion in the feeding direction and outside of the first contact portion with respect to the center in the widthwise direction, and configured to be movable between a third stand-by position and a third operating position;

a fourth contact portion disposed upstream of the first contact portion and the second contact portion in the feeding direction and outside of the second contact portion with respect to the center in the widthwise direction, and configured to be movable between a fourth stand-by position and a fourth operating position;

a moving member configured to (i) be moved from a first position to a second position different from the first position in a case that the first contact portion is moved to the first operating position and the second contact portion is moved to the second operating position, and (ii) be restricted in movement from the first position to the second position in a case that the first contact portion is positioned in the first stand-by position and/or the second contact portion is positioned in the second stand-by position; and a controller, wherein the inside contact portion is disposed between the first contact portion and the second contact portion in the widthwise direction, wherein the first contact portion is moved from the first stand-by position to the first operating position when the third contact portion is moved from the third stand-by position to the third operating position, and the second contact portion is moved from the second stand-by position to the second operating position when the fourth contact portion is moved from the fourth stand-by position to the fourth operating position, and wherein the controller is configured to change a number of the sheet material fed by the feeding member per unit time base on a timing of movement of the inside contact member and a timing of movement of the moving member from the first position to the second position.

11. A sheet material detecting device according to claim 10, wherein the inside contact portion is disposed upstream of the third contact portion and the fourth contact portion in the feeding direction.

12. A sheet material detecting device according to claim 10, wherein the inside contact portion is disposed downstream of the first contact portion and the second contact portion in the feeding direction.

13. A sheet material detecting device according to claim 10, wherein the first contact portion is movable from the first stand-by position to the first operating position in a state in which the third contact portion is positioned in the third stand-by position, and wherein the second contact portion is movable from the second stand-by position to the second operating position in a state in which the fourth contact portion is positioned in the fourth stand-by position.

14. A sheet material detecting device according to claim 10, wherein the first contact portion and the second contact portion are symmetrically disposed with respect to the center in the widthwise direction and the third contact portion and the fourth contact portion are symmetrically disposed with respect to the center in the widthwise direction.

15. An image forming apparatus comprising:

an image forming portion configured to form an image on a sheet material; and a sheet detecting device according to claim 10.

* * * * *